April 30, 1946.    C. A. BIGELOW    2,399,317
AIRPLANE STRUT AND THE LIKE
Filed March 13, 1944

Inventor
Charles H. Bigelow

Patented Apr. 30, 1946

2,399,317

UNITED STATES PATENT OFFICE 2,399,317

AIRPLANE STRUT AND THE LIKE

Charles A. Bigelow, Houston, Tex.

Application March 13, 1944, Serial No. 526,209

2 Claims. (Cl. 188—94)

This invention relates to an airplane strut.

An object of the invention is to provide a shock absorbing strut which has been specially designed for absorbing sudden shocks, such as the shock to which an airplane is subjected in landing.

The strut has been particularly designed to be incorporated into the landing gear of aircraft although it may be adapted for general use as a shock absorber.

A further object of the invention is to provide a strut which is formed of telescoping parts so constructed as to be very strong and to take side thrusts.

With the above and other objects in view the invention has particular relation to certain novel features of construction, operation and arrangement of parts, an example of which is given in this specification and illustrated in the accompanying drawing wherein.

Figure 1:
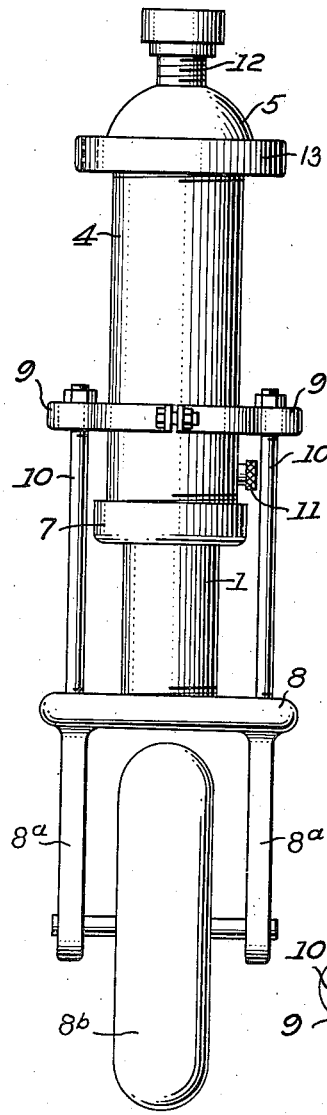
Figure 1 is a front elevational view of the strut.
Figure 3:
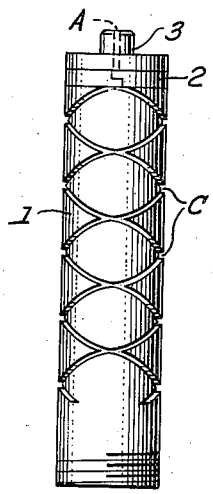
Figure 3 shows a side elevation of the tubular piston.
Figure 2:
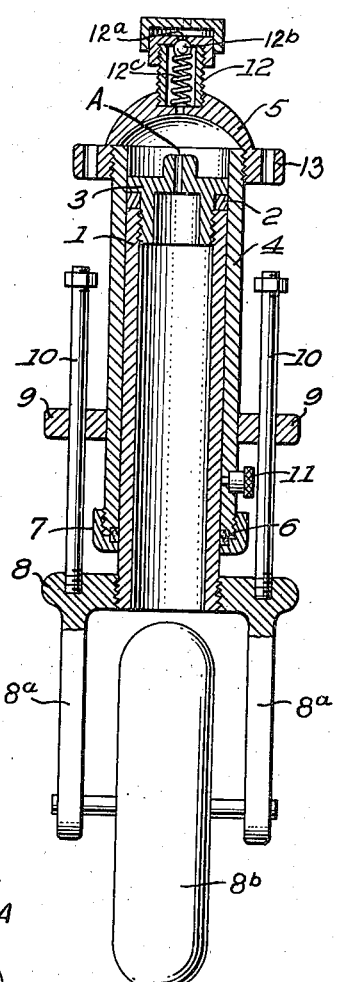
Figure 2 shows a longitudinal, sectional view.
Figure 4:
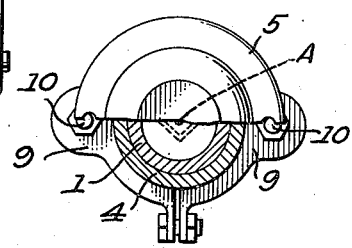
Figure 4 is a top plan view partly in section.

Referring now more particularly to the drawing, wherein like numerals of reference designate the same parts in each of the figures, the numeral 1 designates a tubular piston having the external grooves C for retaining a lubricant.

Abutting one end of the piston there is the piston ring 2 and a piston head 3 is screwed into said end of said piston said head extending through the piston ring and having an annular flange extending beyond it to retain the piston ring in place.

The head 3 has a polygonal extension to receive a wrench for screwing the head into place and unscrewing it and also has the release duct A extending through said head and extension.

The numeral 4 designates a cylinder into which the piston telescopes and is closely fitted and screwed onto one end of the cylinder there is the cylinder head 5.

At the opposite end of the cylinder there is a seal-ring 6 which surrounds the piston and which is retained in place by the flanged nut 7.

Screwed onto the outer end of the piston, that is on the end opposite the piston head, there is a fork 8 having the extended side arms 8a, 8a between which the landing wheel 8b may be mounted to rotate.

Clamped around the cylinder 4 there is a sectional clamp collar 9 and attached to the fork 8 there are the guide rods 10, 10 which work through bearings in said clamp collar.

The cylinder is equipped with a conventional grease cup 11 whereby grease may be supplied to the contacting surfaces of the piston and cylinder.

Mounted on the cylinder head 5 there is an air intake valve assembly having a valve seat 12a provided with an opening therethrough which is controlled by the inwardly opening valve 12b. This valve is normally held closed by the spring 12c within the valve assembly.

A flanged connection 13 is provided whereby the strut may be connected to the aircraft.

When the landing gear is lowered the piston 1 will move downwardly drawing air into the cylinder above the piston head 3 and when the wheel 8b strikes the ground the air will be compressed in the cylinder and gradually released through the duct A thus absorbing the shock.

The landing wheels usually go into contact with, and rebound from the runway successively before the craft comes to a final stop and charges of air will therefore be alternately drawn into the cylinder and released therefrom during the landing operation so that each time the landing wheel strikes the surface of the runway there will be a sufficient quantity of air in the cylinder to absorb the shock.

The cross sectional area of the valve intake port is about six times as great as the cross sectional area of the duct A so that the charges of air may be taken quickly into the cylinder but will be rather slowly released therefrom.

What I claim is:

1. A shock absorbing strut comprising, a cylinder, a tubular piston fitted closely in the cylinder, a piston head on the piston having an air release vent, a cylinder head on the cylinder having an air intake port, a back pressure valve controlling said port, an anchor on the end of the cylinder opposite said head, a collar clamped around the cylinder having bearings, guide rods secured to said anchor and working through said bearings.

2. A shock absorbing strut comprising, a cylinder having a head on one end, a valve casing on the head provided with a valve seat and having an air inlet port, an inwardly opening valve in the casing controlling said port, a spring normally holding the valve closed, a tubular piston fitted closely in the cylinder and having seal rings therearound adjacent its ends, a head on the inner end of the piston retaining one of the seal rings in place and having air release duct therethrough of less cross sectional area than that of the air inlet port, a rod anchor on the other end of the cylinder, side bearings on the cylinder, guide rods attached to said anchor and slidable through said bearings.

CHAS. A. BIGELOW.